(12) United States Patent
Cistone et al.

(10) Patent No.: US 6,720,467 B2
(45) Date of Patent: Apr. 13, 2004

(54) POLYSTYRENE RECLAMATION PROCESS

(75) Inventors: David R. Cistone, Pennsville, NJ (US); L. Steven Moore, West Chester, PA (US); Edmond J. Carreras, Newtown Square, PA (US)

(73) Assignee: Resource Recovery Technologies, Inc., Paoli, PA (US)

( * ) Notice: Subject to any disclaimer, the term of this patent is extended or adjusted under 35 U.S.C. 154(b) by 0 days.

(21) Appl. No.: 09/970,637

(22) Filed: Oct. 4, 2001

(65) Prior Publication Data

US 2002/0062054 A1 May 23, 2002

Related U.S. Application Data

(60) Provisional application No. 60/239,487, filed on Oct. 11, 2000.

(51) Int. Cl.[7] .................................................. C07C 5/00
(52) U.S. Cl. ........................ 585/241; 585/435; 585/436
(58) Field of Search ................................ 585/241, 435, 585/436

(56) References Cited

U.S. PATENT DOCUMENTS

| | | | |
|---|---|---|---|
| 3,804,145 A | * | 4/1974 | Arnold et al. ............ 159/48.1 |
| 4,517,312 A | | 5/1985 | Kumasaka et al. |
| 5,198,471 A | | 3/1993 | Nauman et al. |
| 5,223,543 A | | 6/1993 | Iovino |
| 5,232,954 A | | 8/1993 | Peters |
| 5,269,948 A | | 12/1993 | Krutchen |
| 5,300,267 A | | 4/1994 | Moore |
| 5,616,549 A | | 4/1997 | Clark |
| 5,629,352 A | | 5/1997 | Shiino et al. |
| 5,824,162 A | | 10/1998 | Clark |
| 5,824,709 A | | 10/1998 | Suka |
| 5,891,403 A | | 4/1999 | Badger et al. |

FOREIGN PATENT DOCUMENTS

JP   11-302441   * 11/1999

OTHER PUBLICATIONS

Patent Abstracts of Japan, vol. 2000, No. 2 (JP 11 302441A1: 99–11–02: Naru KK et al.).
Patent Abstracts of Japan, vol. 2000, No. 11 (JP 2000 212325: 2000–08–02: Kakoki Kankyo Service KK et al.).

* cited by examiner

*Primary Examiner*—Thuan D. Dang
(74) *Attorney, Agent, or Firm*—Arthur G Seifert

(57) ABSTRACT

This disclosure concerns a process and apparatus for reclamation of waste polystyrene-type materials for reuse within the specification ranges of the input polystyrene-type material. The disclosed process and apparatus include dissolution of the waste polystyrene-type materials in a dissolve section utilizing a reusable solvent having a low boiling point and high vaporization rate, removal of solid contaminants in one or more filter sections, devolatilization of the dissolved polystyrene and recovery of the polystyrene-type material in a solid form in a recovery section. Preferably the process and apparatus provide a closed system and include recycling and reuse in the process of the vaporized solvent. The maximum temperature in the recovery section is 190° C. The reusable solvent is preferably environmentally safe and has a low boiling point and high vaporization rate. n-Propyl bromide, or environmentally safe mixtures thereof, including mixtures with isopropyl alcohol, is the preferred reusable solvent.

19 Claims, 2 Drawing Sheets

POLYSTYRENE RECLAMATION PROCESS

CROSS REFERENCE TO RELATED APPLICATIONS

This application claims priority from provisional application Ser. No. 60/239,487, filed on Oct. 11, 2000.

BACKGROUND OF THE INVENTION

1. Field of the Invention

This application concerns a process and apparatus for the reclamation of polystyrene-type waste materials and a reclaimed polystyrene product. Due to the choice of dissolution solvent and the use of lower temperatures in the recovery section, the reclaimed polystyrene product will not be subject to degradation. Accordingly, the reclaimed polystyrene product will be within the specification ranges of the input polystyrene-type material.

The process and apparatus include dissolution of the waste polystyrene-type materials in a dissolve section utilizing a reusable solvent having a low boiling point and high vaporization rate, removal of solid contaminants in one or more filter sections, devolatilization of the dissolved polystyrene and recovery of the polystyrene-type material in a solid form in a recovery section. Preferably the process and apparatus include recycling and reuse in the process of the vaporized solvent from the recovery section. The process and apparatus may also include reduction of the polystyrene-type material to be reclaimed in a reduction section prior to its entry into the dissolve section. The maximum temperature in the recovery section is 190° C. The reusable solvent is preferably environmentally safe and has a low boiling point and high vaporization rate. n-Propyl bromide, or environmentally safe mixtures thereof, is the preferred reusable solvent.

The recovery of plastic materials has been a focus of many organizations, governments, and individuals for some time. Some plastic materials, such as polyethylene-terephthalate and polyethylene, have found extensive use in the recycling industry. However, recycling of polystyrene-type resins has not met with the same technical or economical success, and the disposal of polystyrene-type materials continues to present unresolved environmental problems. No simple means for recovery of polystyrene-type material is presently available, especially when the polystyrene-type material are fabricated into foam material. Polystyrene foam is much less dense than non-foamed polystyrene because it contains considerable volume of air encapsulated by the solid polystyrene construction. This increases the storage, transportation and disposal costs, including the use of mechanical and chemical means of reducing the size of such waste material. Waste toner, for example, as used in copying and printing machines, is another polystyrene based product which is in need of an environmentally safe means of recovery.

Due to the lack of efficient and environmentally safe recycling means, most of the products made of polystyrene-type materials are disposed of in landfills or incinerated. However, the polystyrene resin in such landfills does not decompose and may be dissolved by leachate from decomposition of other organic matter. The resulting leachate material contaminates the methane gas generated in landfills, which is finding use as a fuel source by energy generating companies. Thus, the removal of polystyrene-type materials from solid landfill materials is desirable even though their presence could add to the fuel value. Similarly, when the polystyrene resin is incinerated, the resulting gases are toxic and heavy carbon deposits tend to cause clogging of the stacks.

Current methods for recycling polystyrene have the additional drawback of degrading the material so that it is not reusable for the same grade or quality of polystyrene-type product as the waste material. This further devalues the recovered polystyrene-type material. The present process, on the other hand, will provide a reclaimed polystyrene product within the specification ranges of the input polystyrene-type material, where the input material comprised of a single polystyrene or closely related polystyrenes. Even when reclaimed from diverse waste polystyrenes, the reclaimed polystyrene product of the invention exhibits a surprisingly high quality when compared to a similar product made from virgin polystyrene.

2. Prior Art

U.S. Pat. No. 4,517,312, to Kumasaka et al., describes a process for regenerating a resin based on dissolving the waste plastic in an organic solvent and the solution mixed with an immiscible solvent, scarcely dissolving the resin, which will then precipitate the resin. Organic solvents having specific gravities larger than water, such as methylene chloride, trichloroethylene or carbon tetrachloride are preferably used. In the examples wherein waste foam polystyrene foam is recovered, it is dissolved in methylene chloride and then mixed with water resulting in the resin separating out at the interface of the liquids. Such solvents are not considered environmentally safe.

U.S. Pat. No. 5,198,471, to Nauman et al., describes a process for selectively separating various plastic materials found in a typical waste stream from a household. The process utilizes specific solvents to separate each type of plastic of the commingled stream, then separates the resulting solution from the remaining materials and removes the solvent to recover the specific resin. Tetrahyrofuran, toluene, and xylene are used to dissolve mixtures of polystyrene (PS) materials with other plastic materials, resulting in a mixture of PS and one or more other plastic materials in solution. The other plastic materials may be present individually or in combination and include polyvinyl chloride (PVC), low and high density polyethylene (LDPE and HDPE), polypropylene (PP), and polyethylene terephthalate (PET). However, for efficient operation of the process, the dissolved solids concentration must be either very little <20% or concentrated to >80%, preferably <10% or concentrate to >80%, to be effective. For a PVC/PS mixture first dissolved in tetrahydrofuran, methylene chloride may be used to separate out the PS. The flash evaporation (devolatilization) temperature is between 200° C. and 400° C. and takes the solution to a concentration of 50–95% by weight of polymer solids.

U.S. Pat. No. 5,223,543, to Iovino, describes a process for reducing the volume of polystyrene foam using d-limonene as a solvent.

U.S. Pat. No. 5,269,948, to Krutchen, describes decontamination of polystyrene using styrene monomer to dissolve the contaminated polystyrene. The resultant solution is then used in the polymerization of polystyrene.

U.S. Pat. No. 5,300,267, to Moore, describes process and apparatus to reclaim solid polystyrene type waste materials. It includes a dissolve unit and a recovery unit that is based on thin film evaporation and higher temperatures for processing with the solvent, the specific solvent being perchloroethylene.

U.S. Pat. No. 5,629,352, to Shiino et al., describes a process for reduction of polystyrene foam and the recycling of such using solvents consisting of a mixture of a glycol ether and dialkyl ester. The solvent comprises at least one member selected from the group consisting of such a glycol ether compound as diethylene glycol dimethyl ether, diethylene glycol diethyl ether, or dipropylene glycol dimethyl ether and such a fatty acid dialkyl ester compound as dimethyl succinate, dimethyl glutarate or dimethyl adipate. These solvents have flash points of 100° C. or greater and need the addition of water to be made non-flammable.

U.S. Pat. No. 5,824,709, to Suka, discloses a process wherein a waste plastic containing a polymer such as polystyrene, polypropylene or ABS resin is dissolved in a solvent to forma solution of waste plastic at elevated temperature. The solution is filtered to remove labels or adhered foreign debris. The filtrate is heated to a temperature of 200° C. to 300° C. under a pressure of 1–75 torrs to remove the solvent by evaporation, and the resulting plastic melt is extruded into pellet whereby the waste plastic is recovered. If the plastic material to be recovered is polystyrene, toluene and ethylbenzene are the most preferred solvents.

U.S. Pat. No. 5,891,403, to Badger et al., describes a portable waste disposal unit for treating waste polystyrene, especially foamed polystyrene, using perchloroethylene as the solvent. The waste polystyrene solution is later shipped to an appropriate waste recovery facility.

SUMMARY OF INVENTION

The present invention provides apparatus, operatively interconnected, to reclaim polystyrene-type polymer waste material, comprising an optional reduction section, a dissolve section, one or more filtering sections, and a recovery section to recover the polystyrene-type material in solid form, and preferably includes means to remove, store and reuse the solvent in the apparatus. The starting material may be foamed or non-foamed solid polystyrene materials, preferably substantially free of other types of plastic materials. The present invention also provides a process for reclaiming waste polystyrene-type plastic materials, said process comprising the steps of (1) optionally reducing the size of the bulk polystyrene-type material in a reduction unit and transferring the size-reduced polystyrene-type material to a dissolve unit, (2) dissolving the polystyrene material in a reusable polystyrene solvent in the dissolve unit, (3) transferring the solution of polystyrene-type material to a preheater unit, (4) superheating the solution of polystyrene-type material to a temperature of less than 190° C. in the preheater unit, (5) transferring the superheated solution of polystyrene-type material to an extruder (6) devolatilizing the solution of polystyrene-type material at different points as it moves through the extruder while maintaining the temperature at less than 190° C., and (7) cooling the extrudate to form solid reclaimed polystyrene-type material. Preferably, the reusable polystyrene solvent is removed and transferred to a storage unit or directly to the dissolve section during the recovery stage.

This process provides reclaimed waste polystyrene-type plastic materials for reuse within the specification ranges of the input polystyrene-type material, particularly when the waste polystyrene is comprised of a single polystyrene or closely related polystyrenes. Where the reclamation is from diverse waste polystyrenes, the reclaimed polystyrene product of the invention exhibits a surprisingly high quality when compared to a similar product made from virgin polystyrene.

DETAILED DESCRIPTION OF THE INVENTION

The subject invention provides a process for reclaiming waste polystyrene-type plastic materials, said process comprising the steps of (1) dissolving the polystyrene material in a reusable polystyrene solvent in a dissolve unit,
(2) transferring the solution of polystyrene-type material to a preheater unit,
(3) superheating the solution of polystyrene-type material to a temperature of less than 190° C. in the preheater unit,
(4) transferring the superheated solution of polystyrene-type material to an extruder,
(5) devolatilizing the solution of polystyrene-type material at different points as it moves through the extruder while maintaining its temperature at less than 190° C., and
(6) recovering the extrudate reclaimed polystyrene-type material in solid form. Optionally, the process can provide a first step which comprises reducing the size of the bulk polystyrene-type material in a reduction unit and transferring the size-reduced polystyrene-type material to the dissolve unit.

The reusable polystyrene solvent preferably has a low boiling point, preferably 35° C. to 90° C. and a high evaporation rate, preferably 3–7 [AST D353976, butyl acetate=1], allowing devolatilization of the semisolid extrudate to occur at lower temperatures (i.e., less than 190° C.) than is standard for the production of polymer polystyrene and other processes that utilize solvents for waste polystyrene recycling. Additionally, the reusable polystyrene solvent is preferably environmentally safe. n-Propyl bromide, or an environmentally safe mixture thereof having a low boiling point and high vaporization rate as above, is a preferred reusable solvent. Environmentally safe means that the solvent is non-flammable and non-hazardous, and preferably non-corrosive, as determined by US OSHA and EPA regulations. More preferably, environmentally safe also means that the solvent meets the Montreal Protocol for Global Warming Potential (GWP) and Ozone Depletion Potential (ODP) and having a US Postal Service designation of non-hazardous. Preferably the reusable solvent may itself be reclaimed, that is treated to return it substantially to its original components.

n-Propyl bromide may be obtained commercially as Ensolv® from EnviroTech International, Inc., Melrose Park, Ill., U.S.A. The General Use n-propyl bromide product is preferred. These n-propyl bromide products are further described in U.S. Pat. Nos. 5,616,549 and 5,824,162, both to Lawrence A. Clark, which are incorporated herein by reference in their entirety. Generally, they are composed of 90 to 96.5% n-propyl bromide and 0% to 6.5% of a mixture of terpenes and 3.5% to 5% of a mixture of low boiling solvents. EnSolv® is environmentally safe, including meeting the standards of the Montreal Protocol for Global Warming Potential (GWP) and Ozone Depletion Potential (ODP) and having a US Postal Service designation of non-hazardous. For use in the present invention, n-propyl bromide or such environmentally safe mixtures thereof, may further include environmentally safe diluents, such as, isopropyl alcohol. When isopropyl alcohol is used as a diluent it preferably comprises 10 per cent or less of the mixture by weight.

In the process of the invention the temperature is maintained at less than 190° C., preferably less than 180° C., throughout the process, preferably less than 100° C. in the dissolve and filtering sections and less than 160° C. in the recovery section. Also, the overall process time is preferably maintained at less than 4 hours, and more preferably at less than 2 hours. The process time in the recovery section is preferably maintained at less than 1 hour and more preferably at less than ½ hour.

The reduction section is preferably a shredder-grinder type unit that takes the polystyrene-type material from an external source, such as expanded polystyrene foam (EPS foam) used in packaging crates for food shipment, protective packaging for shipment of electronic components, display materials, safety helmet liners, discarded disposable dinner utensils, and such, and reduces its size to allow exposure of the surface for greater contact with the solvent.

The waste polystyrene material, optionally size-reduced, is fed into a dissolve unit where the reusable polystyrene solvent is introduced. The dissolving of the polystyrene-type materials may be enhanced through use of heat and agitation of solution. Means to heat and agitate the solution in the dissolve unit are provided. Further, means to monitor and control the agitation, viscosity, pressure and temperature are also provided. Means to condense and return the solvent, which may volatilize during the dissolving process, to the solution is also provided. One or more of the filters of the filter section may be integral with the dissolve unit. Thus, the filters to remove any particulate matter from the solution may be internal or external to the dissolve unit. These filters will remove all solids present due to either external contamination or other materials such as plastics, paper, tape, etc., which are not dissolved by the solvent and will further clarify the solution to remove finer particulate matter. After passing through the dissolve unit and the filter section, the polystyrene solution is then transferred to the recovery section.

The main portion of the recovery section is preferably an extruder-type unit set up as a devolatilizer. Preferably, the recovery section also includes a preheater to superheat the solution prior to introduction into the extruder. The preheater includes means to monitor and control the temperature and pressure so that the desired maximum temperature for the material being processed (less than 190° C.) is not exceeded. The preheated solution is then pumped under pressure through a valve into the extruder feed section, causing immediate flashing of the low boiling, high vaporization rate solvent that greatly increases the solids content fed to the extruder screw. Preferably, the system will be closed to prevent loss of solvent to the atmosphere and facilitate reuse of the solvent in the process. Thus, except for the introduction of the waste polystyrene material into the reduction unit, the system, including introduction of the waste polystyrene material into the dissolve unit to its exit from the extruder plus the internal recycling of the reusable polystyrene solvent, preferably remains closed to the atmosphere. Maintaining the system closed to the atmosphere also increases the environmental safety of the process.

The extruder unit, including the feed section, of the recovery section preferably will include several ports to transfer the volatilized solvent to a condensation unit for capture of the devolatilized solvent. Preferably, one or more ports at the end of the extruder will be attached to vacuum means to enhance complete devolatilization of the extrudate melt. The continual introduction of mechanical work and addition of some external heat in the extruder along with application of vacuum ensures that the remainder of the solvent is volatilized. Means to monitor and control the temperature and pressure are provided in the extruder portion of the recovery section in order to facilitate devolatilization, extrusion and maintaining the temperature below 190° C., preferably below 180° C. After the exit from the end of the extruder, the polystyrene-type polymer melt is cooled and then preferably chopped into pellets in a manner known in the art. The reclaimed polystyrene material exiting from the extruder may be configured in larger pieces as required for its use in the end manufacturing process in a manner known in the art. The low boiling point and high evaporation rate of the solvent allows devolatilization to occur at a lower temperature than is standard for production of polystyrene-type polymeric materials, that is below 190° C. This lower processing temperature (and a shorter processing time) substantially eliminates degradation of the waste polystyrene material introduced into the system. Thus, the reclaimed polystyrene-type material product will be within the specification ranges of the input polystyrene-type material for reuse to manufacture like grade polystyrene products.

The condensation of the solvent for reuse in the process of the invention is accomplished by passing the vapors through a condenser that is connected to chillers to ensure the reduction of the solvent vapor to below its boiling temperature and the reduction of its vapor pressure sufficiently to cause condensation. The condensed solvent is then transferred to interim storage for further reuse.

BRIEF DESCRIPTION OF THE DRAWINGS

A complete understanding of the present invention may be obtained by reference to the accompanying drawings when taken together with the detailed description of the invention, in which.

DETAILED DESCRIPTION OF A PREFERRED EMBODIMENT

Figure 1:
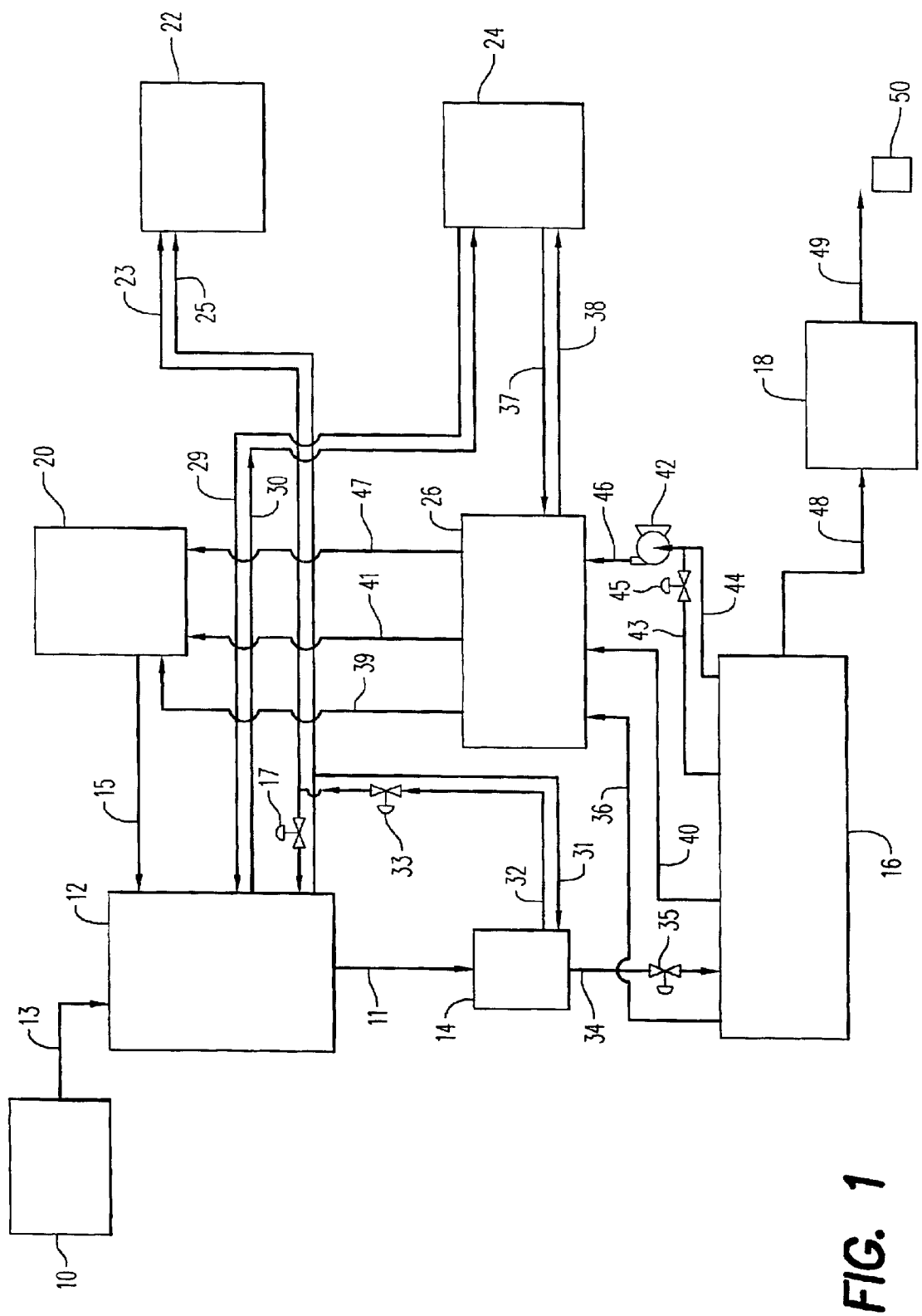
FIG. 1 is a schematic view of the apparatus of the invention.

As best shown in FIG. 1, the present invention provides apparatus for the polystyrene-type materials reclamation process including a reduction section 10, a dissolve tank 12, a recovery section preheater 14, an extruder 16, and a chopper 18. Additionally, the apparatus of the invention includes a solvent storage tank 20, a condenser 26, a heat source 22, and a cooling source 24. The reduction unit 10 is operatively coupled with dissolve unit 12, in that the polystyrene-type material is introduced through a sealed chamber into the dissolve unit 12 utilizing a conveyance device 13. Optionally, a surge tank (not shown) may be added between the dissolve tank 12 and the preheater 14 in order to add other materials to the solution. Such addition may preferably be to the dissolve tank 12 where the added materials can be more efficiently admixed with the waste polystyrene solution in the reusable polystyrene solvent. Non-limiting examples of such added materials are impact modifiers, flame retardants, colorants and toners, particularly toners which have a low content of polystyrene.

Solvent is introduced into the dissolve tank 12 through coupling 15 from the solvent storage tank 20 (or from an alternate source for fresh or externally recycled solvent). The solvent is added to obtain a solution of 15% to 60% by weight, preferably, 30% to 50% by weight of solids. Final solids percent will be determined by the particular type or types of waste polystyrene materials being processed.

Figure 2:
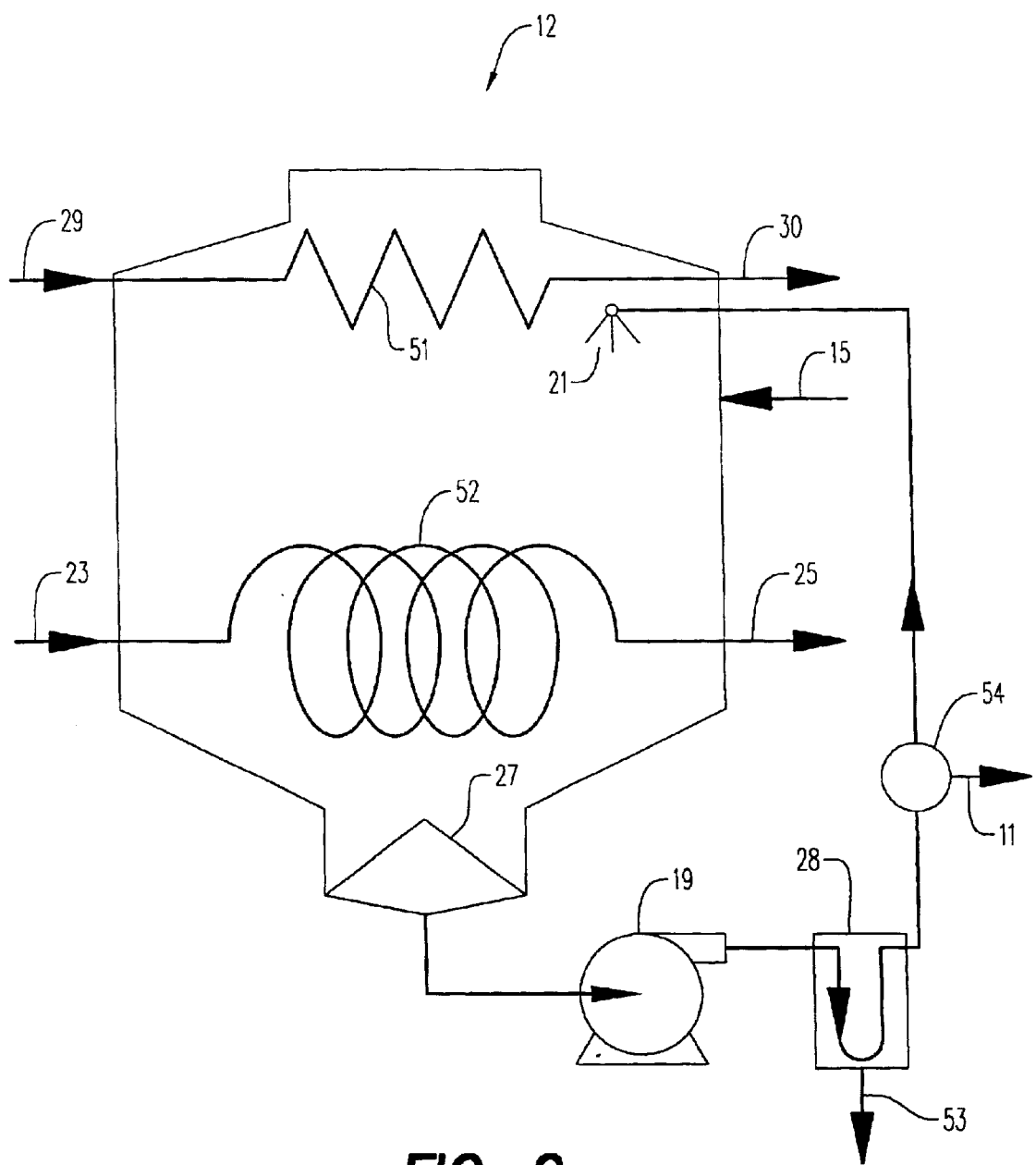
FIG. 2 is a cross-sectional schematic view of the dissolving unit.

As shown in FIG. 2, the dissolve tank 12 includes heating coils 52 coupled through a supply and return line 23 and 25, respectively, to the heat source 22, which is preferably a steam generator. The steam pressure is controlled by relief valve 17 (FIG. 1), to maintain a solution temperature of between 20° C. and 75° C., preferably between 45° C. and 60° C. Means to monitor the temperature and pressure of the dissolve tank 12 are also provided. Means to agitate the solution and measure the viscosity may also be provided. Tests have shown a dissolution solution temperature within this range promotes solvency of the polystyrene-type materials in the reusable polystyrene solvent (preferably n-propyl bromide). Referring still to FIG. 2, during the dissolution step, a portion of the solution is circulated by means of pump 19 through spray nozzles 21, to continually cover the polystyrene-type materials entering the dissolve tank 12.

As shown in FIG. 2, the solution is preferably withdrawn from the dissolve tank 12, through a conical shaped coarse filter 27, to remove course contamination such as paper, tape, and other non-dissolvable materials, and then transferred utilizing pump 19, through a fine filter 28 to remove any fine contamination, to directional valve 54 which is switched to route the solution through coupling 11. The fine filter 28 removes undissolved or partially dissolved small particulate matter. The coarse filter 27 is manually cleaned after each batch is processed. The elements of the fine filter 28 are removed and also manually cleaned after each batch is processed. A drain coupling 53 may be provided at the bottom of the fine filter 28 to facilitate cleaning. (Either or both filters may be of an automatic cleaning type to promote efficiency or use of a continuous process rather than a batch process.)

The directional valve 54 routes the solution either through the nozzles 21, or, as shown in FIG. 1, into preheater 14, through coupling 11. Cooling coils 51 (FIG. 2) connected to chiller 24, through supply and return lines 29 and 30, respectively, are provided at the top of the dissolve tank 12. These chilled coiling coils 51 condense any vapors from the solvent that may have formed during the dissolving process and return the fluid to the solution.

When the dissolution of the polystyrene-type materials is completed, the directional valve 54 is positioned to route the solution from the pump 19 through coupling 11 to preheater 14. The preheater 14 is provided with temperature and pressure monitoring and control means and is connected to the heat generator 22 through supply and return lines 31 and 32 respectfully. The temperature in the preheater 14 is controlled through steam pressure relief valve 33. The preheater 14 is utilized to superheat the solution to between 125° C. and 150° C., preferably between 130° C. and 145° C. The superheating of the solution raises the vapor pressure to >60 psig. Feed temperatures of 80° C. to 100° C. or to 125° C. may also provide desirable results The superheated solution continues from the preheater 14 through coupling 34 to the extruder 16. An expansion valve 35 in coupling 34 is positioned near the feed entrance of the extruder 16, causing immediate vaporization and release of the solvent from solution since atmospheric pressure is maintained on the extruder side of the relief valve 35. The resulting solvent vapors are conducted through coupling 36 to condenser 26. Condenser 26 is chilled through supply and return lines 37 and 38, respectively, from chiller 24. Condenser 26 may comprise one or more condenser units. Chiller 24 temperature is preferably maintained between −10° C. and 0° C. to ensure condensation and recovery of the solvent. Temperature and pressure monitoring and control means are provided for the chiller 24. The condensed solvent is transferred from the condenser 26 through coupling line 39 to the solvent storage tank 20 for reuse in the process.

The semisolid solution from the preheater 14, now higher in solids content, is conveyed and further devolatilized by the internal screw of the extruder 16. External heat may be added to facilitate the extrusion and devolatilization, dependent upon the particular polystyrene-type material being processed. The internal and external energy of the extruder 16 will cause release of additional solvent vapors from the surface of the melt through the vapor port of coupling 40 to the condenser 26. Again the solvent vapors are condensed in condenser 26 and transferred to solvent storage tank 20 (through coupling 41).

The removal of the last of the solvent is facilitated through application of vacuum applied by vacuum pump 42, preferably to the last two vapor ports of the extruder 16 through couplings 43 and 44, respectively. The vacuum is increased on the final port over that of the next to last. The reduction of vacuum pressure to coupling 43 is conveniently accomplished by addition of reduction valve 45 in the coupling line 43. This allows progressive reduction of the solvent throughout the extruder 16 by reducing the vapor pressure necessary to vaporize the solvent. The solvent vapors, at less than atmospheric pressure, exit the vacuum pump 42 through coupling 46 at atmospheric pressure and enter the chilled condenser 26. Again the vapors are condensed and the liquid solvent is transferred to the solvent storage tank 20 through coupling 47. Temperature and pressure monitoring and control means are provided for the extruder 16 and its associated vacuum system.

The semi-solid polystyrene-type material exits the extruder 16, preferably through a strand die coupling 48, and is allowed to solidify before entering chopper 18. Cooling means may be provided to facilitate this solidification. Chopper 18 reduces the solid polystyrene-type materials to pellets which are conveyed by coupling 49 to packaging section 50.

EXAMPLES

The following examples further illustrate the practice of the invention and are not intended to limit the invention.

In the following examples temperature settings and measurements are described in relation to the following portions of the extruder:

Zone 1—vent near, preferably behind, feed zone
Zone 2—feed zone from preheater
Zone 3—between feed zone and first vents
Zone 4—at first vent(s), no vacuum applied
Zone 5—between non-vacuum first vent(s) and vacuum vent(s)
Zone 6—from vacuum vent(s) to discharge head Example 1

In this example 21.25 lbs of waste polystyrene foam were reclaimed. The system was cleaned prior to the run. The polystyrene was dissolved in the Ensolv® n-propyl bromide solvent to provide a 33+% solution on a weight basis.

The following conditions applied to the run

|  | Temperatures | |
| --- | --- | --- |
|  | Setting | Measured (Internal) |
| Zone 1 | 350° F. (177° C.) |  |
| Zone 2 | 325° F. (163° C.) |  |
| Zone 3 | 275° F. (135° C.) | 250–275° F. (121–135° C.) |
| Zone 4 | 275° F. (135° C.) |  |
|  |  | 300° F. (149° C.) |
| Zone 5 | 285° F. (141° C.) |  |
| Zone 6 | 300° F. (149° C.) | 300° F. (149° C.) |

Pressure gauge (Zone 2, above the feed valve)—30 psi
Air Pressure to pump (pumping solution into and through preheater)—90 psi
By-Pass valve (preheater to dissolve unit)—slightly open
Feed valve (i.e. expansion valve 35)—full open Extruder RPM—250
Amps (screw motor, dual screws)—3.0
Feed Temperature (between preheater and expansion valve)—250–275° F. (121–135° C.)
Dissolve unit temperature—100° F. (38° C.)
Recovery rate—10–12 lbs polystyrene/hr. (approximate run time—2 hrs)
Steam on exchanger (to preheater) @85–90 psi
Collected Solvent
0.5 lbs (Zone 6 vents)+21.5 lbs (Zone 4 vents)+7.5 lbs (Zone 1 vents)=29.5 lbs
Ran 21.25 Polystyrene
If 2:1 solution, recovered 69% of solvent (some lost as spillage and evaporation due to sitting overnight in dissolve unit not well sealed)
Placed pellets on hot plate with hot air gun to remove volatiles. Approximately 1% change in weight.
Recovered pellets have a slight reddish color.
The following table shows test results on injection molded key tags made from the reclaimed polystyrene.

TABLE 1

| Physical Property | Control PS (Nova) | Recycled PS with Solvent |
|---|---|---|
| Flexural Modulus (MPa) | 517,000 | 489,000 |
| Tensile Strength (psi) | 6840 | 4925 |

Example 2

In this example, 4 lbs. of a used toner (approx. 25% by weight polystyrene) and 11 lbs. of polystyrene foam are reclaimed. The reclaimed polystyrene is black due to the carbon black of the toner.
The run was started by dissolving the 11 lbs. of foam in 25 lbs. of Ensolv® solvent. After transfer of this solution to the process tank, the 4 lbs. of toner, dissolved in 5 lbs of solvent, were added to the polystyrene foam solution. The resulting solution was circulated through the Kenix™ mixer for 30 minutes.
The following conditions applied to the run

| | Temperatures | |
|---|---|---|
| | Setting | Measured (Internal) |
| Zone 1 | 350° F. (177° C.) | |
| Zone 2 | 325° F. (163° C.) | |
| Zone 3 | 310° F. (154° C.) | 285° F. (141° C.) |
| Zone 4 | 280° F. (138° C.) | |
| | | 300° F. (149° C.) |
| Zone 5 | 300° F. (149° C.) | |
| Zone 6 | 300° F. (149° C.) | 300° F. (149° C.) |

Pressure gauge (Zone 2)-30 psi
Air Pressure to pump-100 psi
By-Pass valve (preheater to process tank)-slightly open
Feed valve-full open
Extruder RPM-200
Amp (screw motor)-2.5
Feed Temperature-180° F. (82° C.)
Dissolve unit temperature-100 T (38° C.)
Recovery rate-3.5–4 lbs polystyrene/hr.
(approx. 4.5 hrs)
after RPM increased to 350-6 lbs/br.
Steam on preheater-@40 psi Foaming of polystyrene material rising in the vent pipe was observed at vent port #1 due solvent vaporizing too rapidly, and the material exiting the extruder appeared to have air bubbles. Lowered RPM to 300, and pump pressure rose to 40 psi Recovered

| Polystyrene | Solvent | |
|---|---|---|
| 7 lbs 2 oz | 8 oz | Pressure tank |
| 6 lbs 8 oz | 5 lbs 4 oz | Rear vent |
| 4 lbs. 10 oz | 17 lbs. | Vent #1 |
| 1 lbs 8 oz-good | 3 lbs | Vent #2 |
| 19.75* lbs-Total | 27.75 | Total |

(*additional material in system from prior run)

Solution remaining in dissolve unit
 2 lbs. 8 oz.
 3lbs
 5.5 lbs—Total 1 lb. 10 oz Polystyrene/3 lbs. 8 oz. solvent
Test of recovered polystyrene resin for volatiles content

| Pan | 16.0 gms |
|---|---|
| Pan + resin | 116.0 gms |
| after heating | 115.0 gms |
| 1% volatiles | |

(Outside laboratory tests showed less than 0.5% volatiles)
What we claim is:

1. A process for reclaiming waste polystyrene plastic materials, said process comprising the steps of
   (1) dissolving the waste polystyrene material in a reusable polystyrene solvent in a dissolve unit,
   (2) transferring the resulting solution of polystyrene material to a preheater unit,
   (3) superheating the solution of polystyrene material to a temperature of less than 190° C. in the preheater unit,
   (4) transferring the superheated solution of polystyrene material to an extruder,
   (5) devolatilizing the solution of polystyrene material at different points as it moves through the extruder while maintaining its temperature at less than 190° C., and
   (6) recovering the extrudate reclaimed polystyrene material in solid form.

2. A process according to claim 1 wherein a first step comprises reducing the size of bulk waste polystyrene material in a reduction unit and transferring the size-reduced waste polystyrene material to the dissolve unit.

3. A process according to claim 1 which is carried out in a closed system.

4. A process according to claim 1 wherein the reusable polystyrene solvent is environmentally safe and has a low boiling point, about 35° C. to 90° C., and a high evaporation rate, about 3–7 [AST D353976, butyl acetate=1].

5. A process according to claim 1 wherein the reusable polystyrene solvent comprises n-propyl bromide and environmentally safe mixtures thereof having a low boiling point, about 35° C. to 90° C., and a high evaporation rate, about 3–7 [AST D353976, butyl acetate=1].

6. A process according to claim 1 wherein the reusable polystyrene solvent comprises n-propyl bromide.

7. A process according to claim 6 wherein the reusable polystyrene solvent further comprises isopropyl alcohol in an amount up to 10 percent by weight of the total solvent.

8. A process according to claim 2 wherein the reusable polystyrene solvent which has evaporated or otherwise been removed during the process is condensed and transferred to a storage unit or directly to the dissolve unit for reuse in the process.

9. A process according to claim 1 wherein the process time for the materials passing through the extruder is less than 1 hour.

10. A process according to claim 9 wherein the process time for the materials passing through the extruder is less than ½ hour.

11. A process according to claim 1 wherein the temperature of the solution in the dissolve unit is 20° C. to 75° C.

12. A process according to claim 11 wherein the temperature of the solution in the dissolve unit is 45° C. to 60° C.

13. A process according to claim 1 wherein the temperature of the materials passing through the preheater unit is 180° C. or less.

14. A process according to claim 1 wherein the temperature of the materials passing through the extruder unit is 125° C. to 150° C.

15. A process according to claim 1, further comprising passing the solution through one or more filters upon or after exiting the dissolve unit and before entering the preheater unit.

16. A process according to claim 1 wherein the waste polystyrene materials comprise polystyrene foam.

17. A process according to claim 1 wherein the waste polystyrene materials comprise toner.

18. A process according to claim 1 wherein the input waste polystyrene material is waste polystyrene material from one or more of the manufacture of polystyrene, the manufacture of modified polystyrene, the manufacture of products made from polystyrene material, and waste polystyrene material from products made from polystyrene material.

19. A process for reclaiming waste polystyrene plastic materials, said process comprising the steps of
  (1) dissolving the waste polystyrene material in a reusable polystyrene solvent in a dissolve unit,
  (2) transferring the resulting solution of polystyrene material to a preheater unit,
  (3) superheating the solution of polystyrene material to a temperature of less than 190° C. in the preheater unit,
  (4) transferring the superheated solution of polystyrene material to an extruder,
  (5) devolatilizing the solution of polystyrene material at different points as it moves through the extruder while maintaining its temperature at less than 190° C., and
  (6) recovering the extrudate reclaimed polystyrene material in solid form
  wherein the reusable polystyrene solvent comprises n-propyl bromide and environmentally safe mixtures thereof having a low boiling point, about 35° C. to 90° C., and a high evaporation rate, about 3–7 [AST D353976, butyl acetate=1].

* * * * *